United States Patent
Azuma et al.

(10) Patent No.: US 12,495,116 B2
(45) Date of Patent: Dec. 9, 2025

(54) SCANNING SYSTEM AND INFORMATION PROCESSING PROGRAM FOR OUTPUTTING PRECEDING AND SUBSEQUENT IMAGE DATA FROM PRECEDING AND SUBSEQUENT DOCUMENTS

(71) Applicant: SEIKO EPSON CORPORATION, Tokyo (JP)

(72) Inventors: Yoshiki Azuma, Nagano (JP); Naoki Oshikawa, Yamanashi (JP); Masayuki Nagase, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/581,440

(22) Filed: Feb. 20, 2024

(65) Prior Publication Data

US 2024/0283884 A1 Aug. 22, 2024

(30) Foreign Application Priority Data

Feb. 21, 2023 (JP) ................................ 2023-025138

(51) Int. Cl.
*H04N 1/32* (2006.01)

(52) U.S. Cl.
CPC ..... *H04N 1/32464* (2013.01); *H04N 1/32112* (2013.01)

(58) Field of Classification Search
None
See application file for complete search history.

(56) References Cited

U.S. PATENT DOCUMENTS

| | | | | |
|---|---|---|---|---|
| 2005/0073709 A1* | 4/2005 | Kujirai | .................. | G06F 3/1262 358/1.14 |
| 2007/0258106 A1* | 11/2007 | Ishiyama | ........... | H04N 1/32112 358/1.15 |
| 2008/0226369 A1* | 9/2008 | Park | .................... | H04N 1/00612 399/374 |
| 2009/0158286 A1* | 6/2009 | Carteri | .................. | G06F 9/5038 718/102 |
| 2009/0323131 A1* | 12/2009 | Toyoda | .............. | H04N 1/00705 358/448 |
| 2012/0212787 A1* | 8/2012 | Hasegawa | .......... | H04N 1/33315 358/447 |
| 2014/0111674 A1* | 4/2014 | Iwasaki | .................. | H04N 23/63 348/294 |
| 2019/0058804 A1* | 2/2019 | Zhang | .................. | H04N 1/0417 |

(Continued)

FOREIGN PATENT DOCUMENTS

JP 2014093556 A * 5/2014

*Primary Examiner* — Akwasi M Sarpong
*Assistant Examiner* — Pawan Dhingra
(74) *Attorney, Agent, or Firm* — Global IP Counselors, LLP

(57) ABSTRACT

A scanning system includes: a document reading unit configured to read a document and generate image data read from the document; a prompting unit configured to prompt a notification unit to add, after the document reading unit reads a preceding document, a subsequent document subsequent to the preceding document; and an output unit configured to, after the document reading unit reads the subsequent document according to the addition, separate and output preceding image data read from the preceding document and subsequent image data read from the subsequent document.

9 Claims, 8 Drawing Sheets

(56) References Cited

U.S. PATENT DOCUMENTS

2020/0021699 A1\* 1/2020 Obara ................ H04N 1/00411
2020/0184291 A1\* 6/2020 Tisdel .............. G06K 19/07758
2021/0358596 A1\* 11/2021 Boda .................. G06F 21/6209

\* cited by examiner

SCANNING SYSTEM AND INFORMATION PROCESSING PROGRAM FOR OUTPUTTING PRECEDING AND SUBSEQUENT IMAGE DATA FROM PRECEDING AND SUBSEQUENT DOCUMENTS

The present application is based on, and claims priority from JP Application Serial Number 2023-025138, filed Feb. 21, 2023, the disclosure of which is hereby incorporated by reference herein in its entirety.

BACKGROUND

1. Technical Field

The present disclosure relates to a scanning system and an information processing program.

2. Related Art

There is known a scanning system in which a plurality of pages of documents are read and image data of a plurality of pages read from the document is collected in one file. An image reading device disclosed in JP-A-2014-93556 has a document addition function, and when a document is added in the middle of document reading processing, image data read from the document before addition and image data read from the document after addition are collected into one continuous file. A consecutive page number is assigned to each piece of image data included in the obtained file.

JP-A-2014-93556 is an example of the related art.

The above-described document addition function has only a function of collecting image data read from a document before addition and image data read from a document after addition to one continuous file, and a more convenient function is required.

SUMMARY

A scanning system according to the present disclosure includes: a document reading unit configured to read a document and generate image data read from the document; a prompting unit configured to prompt a notification unit to add, after the document reading unit reads a preceding document, a subsequent document subsequent to the preceding document; and an output unit configured to, after the document reading unit reads the subsequent document according to the addition, separate and output preceding image data read from the preceding document and subsequent image data read from the subsequent document.

In addition, in a non-transitory computer-readable storage medium storing an information processing program according to the present disclosure, the program causes a computer to execute: an acquisition function of acquiring preceding image data obtained by reading a preceding document by a document reading unit and subsequent image data obtained by reading a subsequent document added after the preceding document; and an output function of separating and outputting the preceding image data and the subsequent image data.

DESCRIPTION OF EMBODIMENTS

Figure 1:
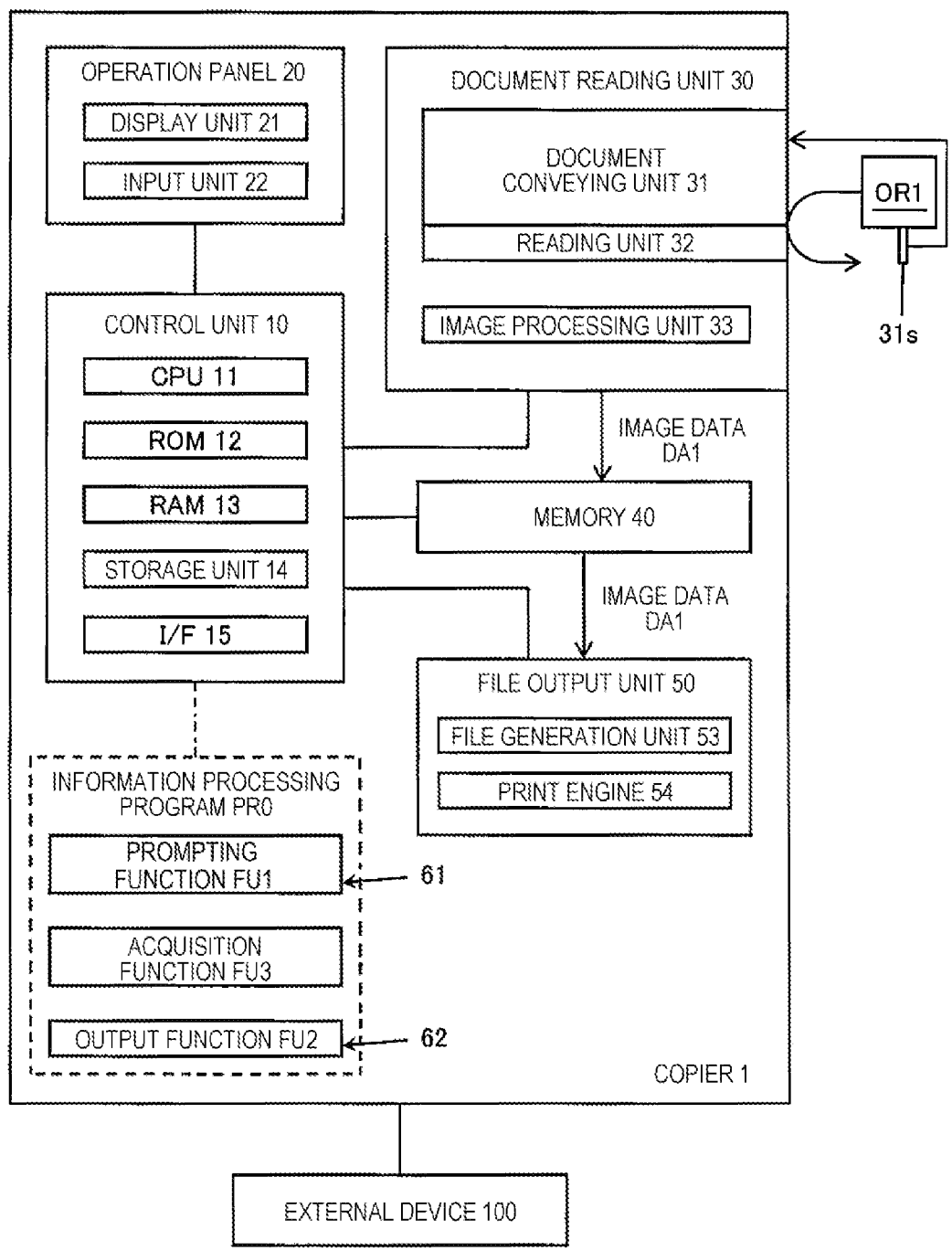
FIG. 1 is a block diagram schematically showing a configuration example of a scanning system.

Hereinafter, an embodiment of the present disclosure will be described. Of course, the following embodiment merely shows the present disclosure, and all of the features described in the embodiment are not necessarily essential to the solutions disclosed herein.

1. Overview of Technique Included in Present Disclosure

First, an overview of a technique included in the present disclosure will be described with reference to examples shown in FIGS. 1 to 9. Drawings of the present application are diagrams schematically showing examples, and a magnification in each direction shown in the drawings may be different, and the drawings may not be consistent. Of course, each element of the present technique is not limited to the specific examples indicated by the reference signs. In "Overview of Technique Included in Present Disclosure", terms in parentheses mean supplementary explanations of immediately preceding terms.

Aspect 1

Figure 2:
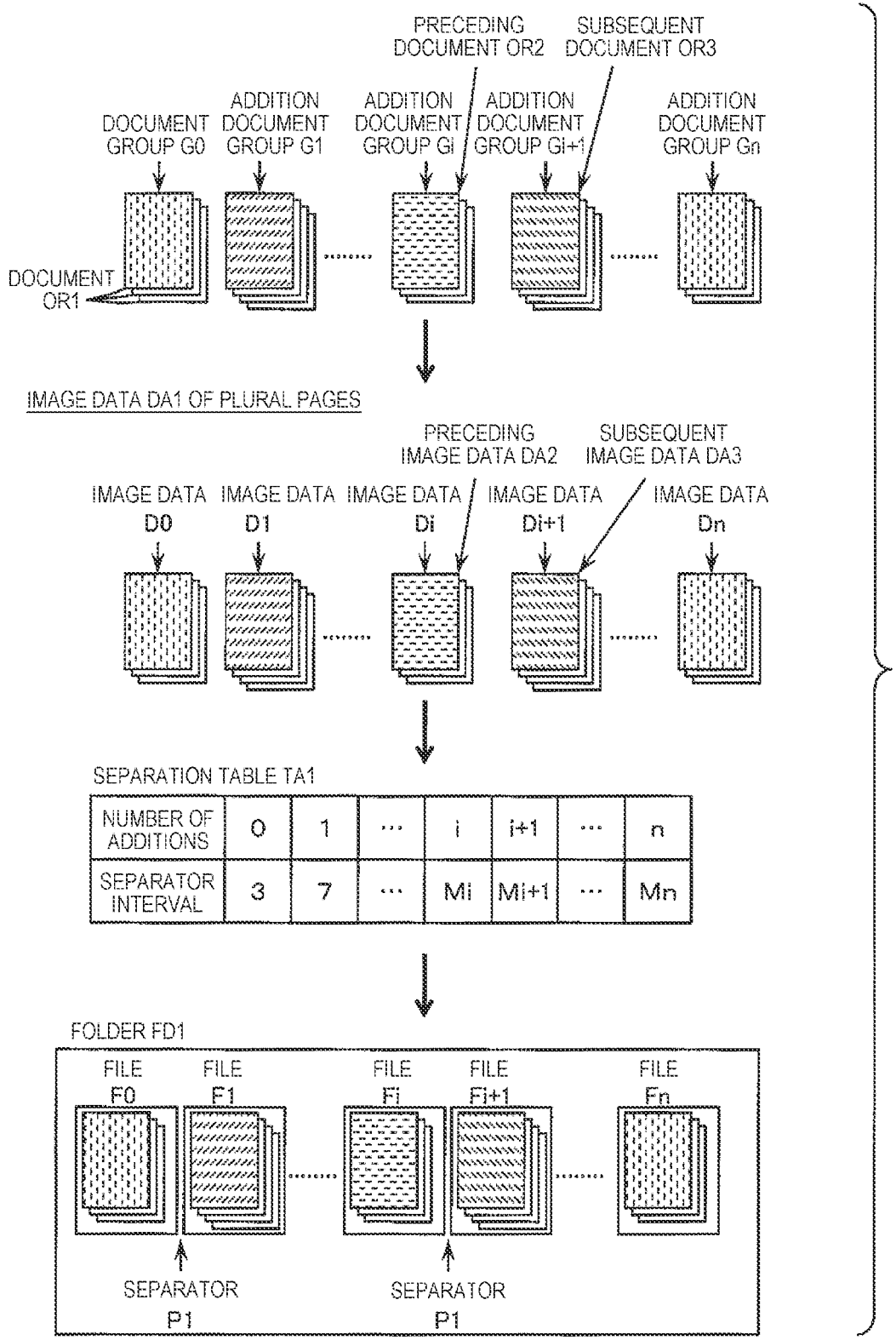
FIG. 2 is a diagram schematically showing an example in which preceding image data read from a preceding document and subsequent image data read from a subsequent document are output as different files.
Figure 3:
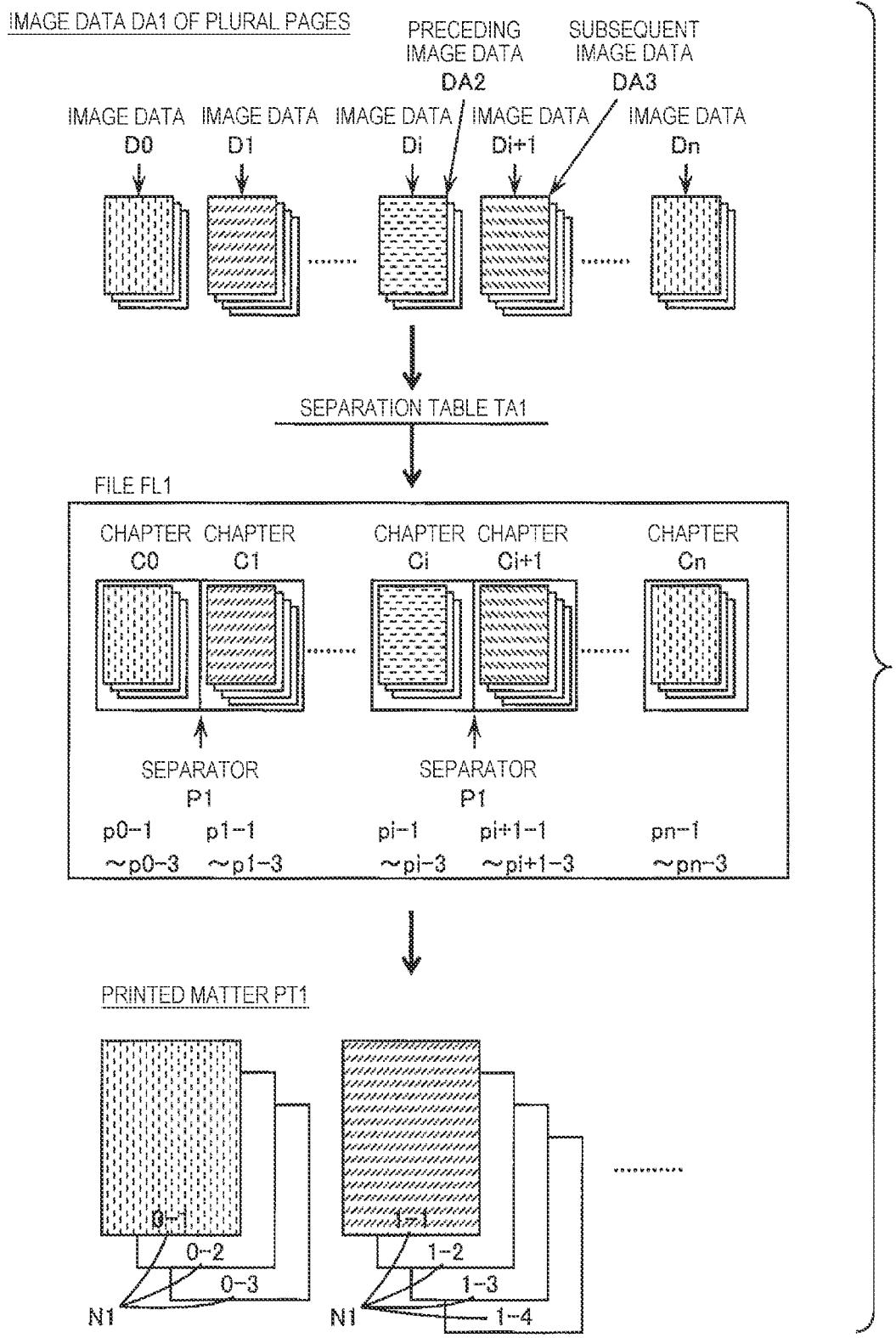
FIG. 3 is a diagram schematically showing an example in which page numbers of different chapters are assigned to the preceding image data read from the preceding document and the subsequent image data read from the subsequent document.
Figure 4:
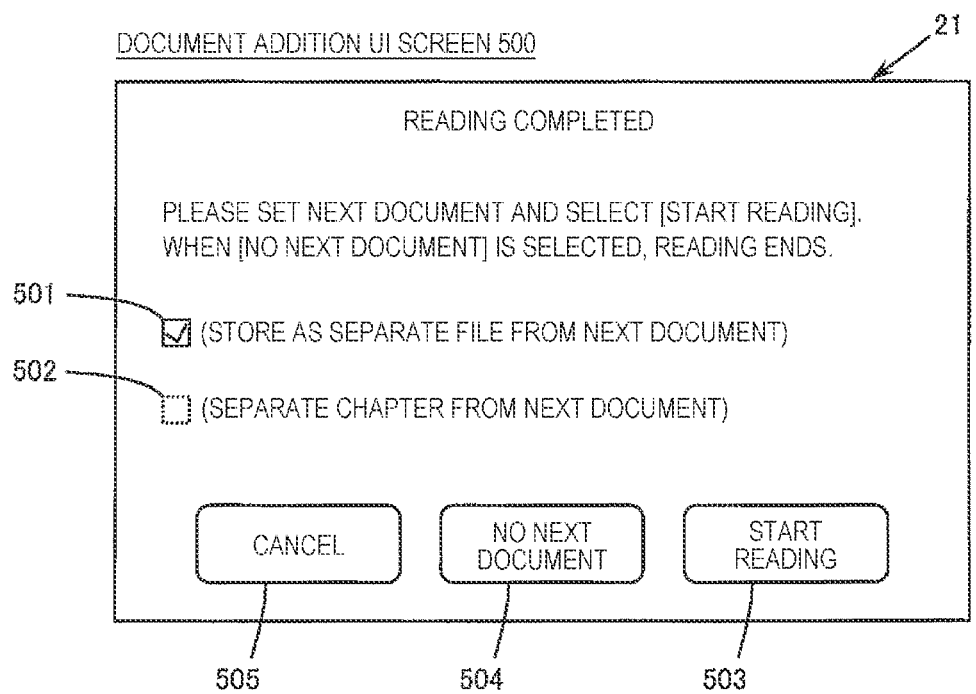
FIG. 4 is a diagram schematically showing a display example of a document addition UI screen.

As shown in FIG. 1 and the like, a scanning system SY1 according to an aspect of the present technique includes a document reading unit 30, a prompting unit 61, and an output unit 62. As shown in FIG. 2 and the like, the document reading unit 30 reads a document OR1 and generates image data DA1 read from the document OR1. As shown in FIG. 4, the document reading unit 30 reads a preceding document OR2, and then the prompting unit 61 prompts a notification unit (for example, a display unit 21) to add a subsequent document OR3 subsequent to the preceding document OR2. As shown in FIGS. 2 and 3, after the document reading unit 30 reads the subsequent document OR3 according to the addition, the output unit 62 separates and outputs preceding image data DA2 read from the preceding document OR2 and subsequent image data DA3 read from the subsequent document OR3. In the present application, "addition" means that, after the document reading unit reads the preceding document that precedes, the user sets the following subsequent document, so that the subsequent document can be scanned with a scan setting that is the same as that of the preceding document even when the user does not perform the scan setting following the preceding document. Although the scan setting of the subsequent document may be changed from the scan setting of the preceding document, the scan setting of the preceding document is used as it is unless the user performs a specific operation. Unlike a case in which scanning is repeated a plurality of times, in which, after reading a previous document, a scan setting and a scan instruction are performed again from the beginning and then a subsequent document is read, in the case of "addition", it is possible to reduce the number of operations required by the user.

In an output image data group, the preceding image data DA2 read from the preceding document OR2 and the subsequent image data DA3 read from the subsequent document OR3 are separated. Since the output image data group has a separator P1 corresponding to the document addition, the above aspect can provide a scanning system that improves convenience of reading a document group.

Here, the scanning system may be a single device such as a copier (including a multifunction peripheral) or a plurality of devices such as an image reading device and a host device.

Promoting of addition by the prompting unit may be made by using a display of the scanning system as a notification unit to display a message prompting the addition, by using a speaker of the scanning system as a notification unit to output a voice prompting the addition, or by using a personal terminal of a user external to the scanning system as a notification unit for prompting.

Separating and outputting the preceding image data and the subsequent image data includes outputting the preceding image data and the subsequent image data as different files as in the following Aspect 2, and outputting the preceding image data and the subsequent image data by assigning page numbers of different chapters to the preceding image data and the subsequent image data, as in the following Aspect 4.

An output of the image data obtained by the output unit may be an output outside of the output unit, and may be an output to an external device coupled to an image forming device, sending of an e-mail, an output to a storage unit in the image forming device, a print of the image data, a display of the image data, or the like.

The image data group output from the output unit may include image data other than the preceding image data and the subsequent image data described above.

The above-described additional features are also applied to the following aspects.

Aspect 2

Figure 7:
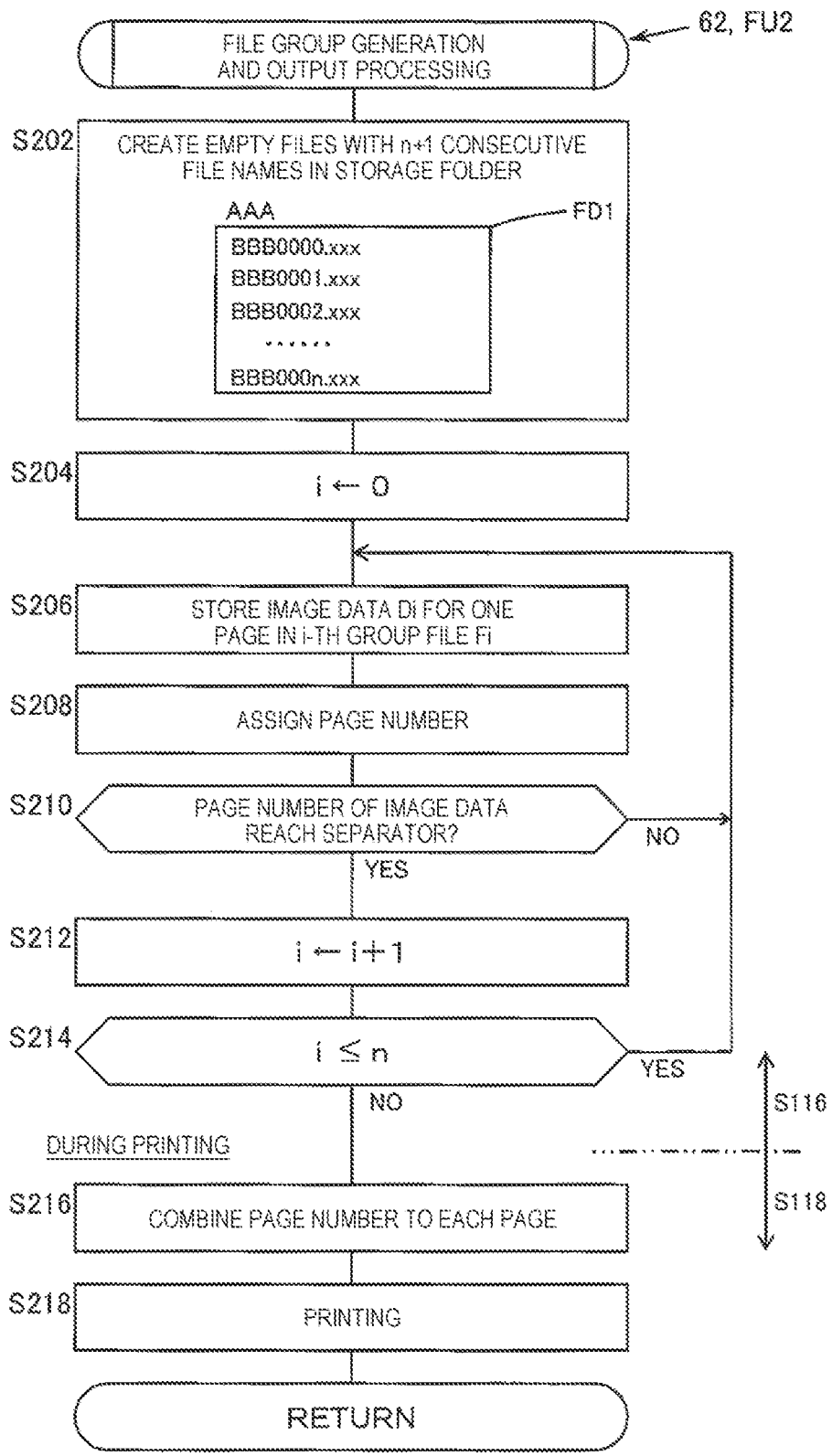
FIG. 7 is a flowchart schematically showing an example of file group generation and output processing.

As shown in FIGS. 2 and 7, the output unit 62 may output the preceding image data DA2 and the subsequent image data DA3 as different files Fi and Fi+1.

In the above case, the preceding image data DA2 and the subsequent image data DA3 are separated into different files Fi and Fi+1. Therefore, the above aspect can provide a preferable example in which convenience of reading a document group is improved.

A page number assigned to each image data DA1 in each of the files Fi and Fi+1 is not particularly limited, and may be a page number starting from page one in each of the files Fi and Fi+1, or a page number continuous over the entire image data group so that the page number of the subsequent image data DA3 is subsequent to the page number of the preceding image data DA2. The additional features are also applied to the following aspects.

Aspect 3

As shown in FIG. 7, the output unit 62 may add names including consecutive numbers to each of the files Fi and Fi+1.

In the above case, the preceding image data DA2 and the subsequent image data DA3 are separated into the files Fi and Fi+1 whose names include consecutive numbers. Therefore, the above aspect can provide a further preferable example in which convenience of reading a document group is improved.

Aspect 4

Figure 8:
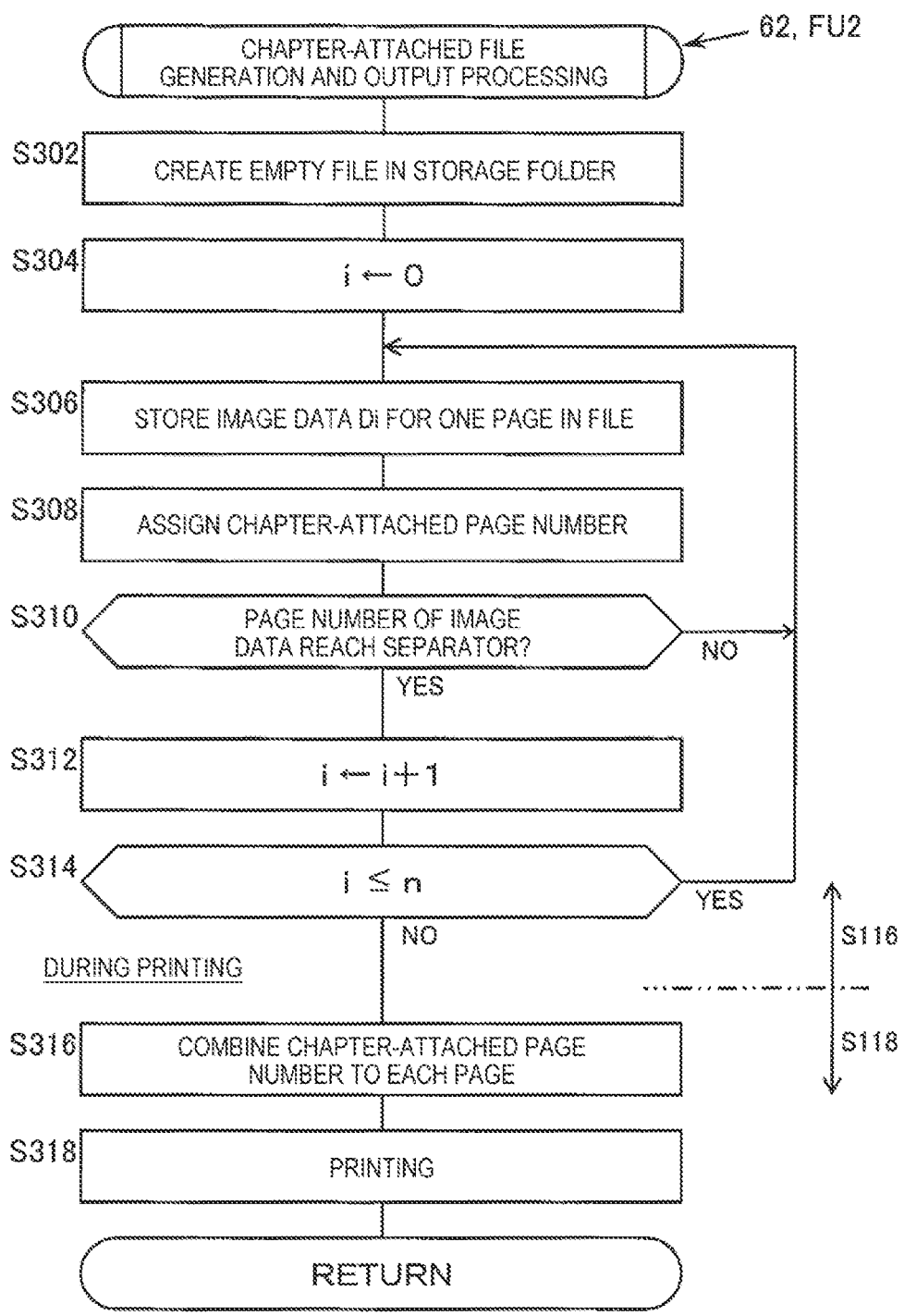
FIG. 8 is a flowchart schematically showing an example of chapter-attached file generation and output processing.

As shown in FIGS. 3 and 8, the output unit 62 may assign page numbers of different chapters Ci and Ci+1 to the preceding image data DA2 and the subsequent image data DA3 and output the preceding image data DA2 and the subsequent image data DA3.

In the above case, the preceding image data DA2 and the subsequent image data DA3 are separated into different chapters Ci and Ci+1. Therefore, the above aspect can also provide a preferable example in which convenience of reading a document group is improved.

The page number (excluding chapters) assigned to each image data DAL in each of the chapters Ci and Ci+1 is not particularly limited, and may be a page number starting from page one in each of the chapters Ci and Ci+1, or a page number continuous over the entire image data group so that the page number of the subsequent image data DA3 is subsequent to the page number of the preceding image data DA2. The additional features are also applied to the following aspects.

Aspect 5

As shown in FIGS. 3 and 8, the output unit 62 may output the preceding image data DA2 and the subsequent image data DA3 as one file FL1.

In the above case, the preceding image data DA2 and the subsequent image data DA3 included in one file FL1 are separated into different chapters. Therefore, the above aspect can provide a further preferable example in which convenience of reading a document group is improved.

Aspect 6

As shown in FIGS. 3 and 8, the output unit 62 may combine, to the preceding image data DA2 and the subsequent image data DA3, the page numbers to which the chapters Ci and Ci+1 are attached (for example, a chapter-attached page number N1) and output the composite. In the aspect, since the image data group to which the chapter-attached page number (N1) is combined is output, it is easy to understand which chapter each page of the image data belongs to.

Aspect 7

Figure 5:
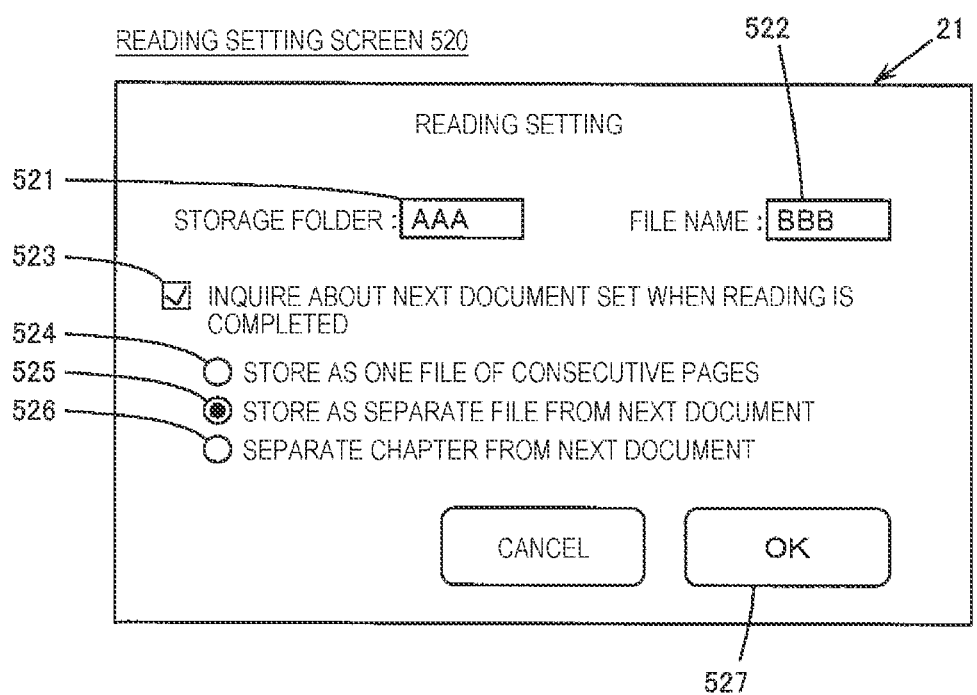
FIG. 5 is a diagram schematically showing a display example of a reading setting screen.
Figure 9:
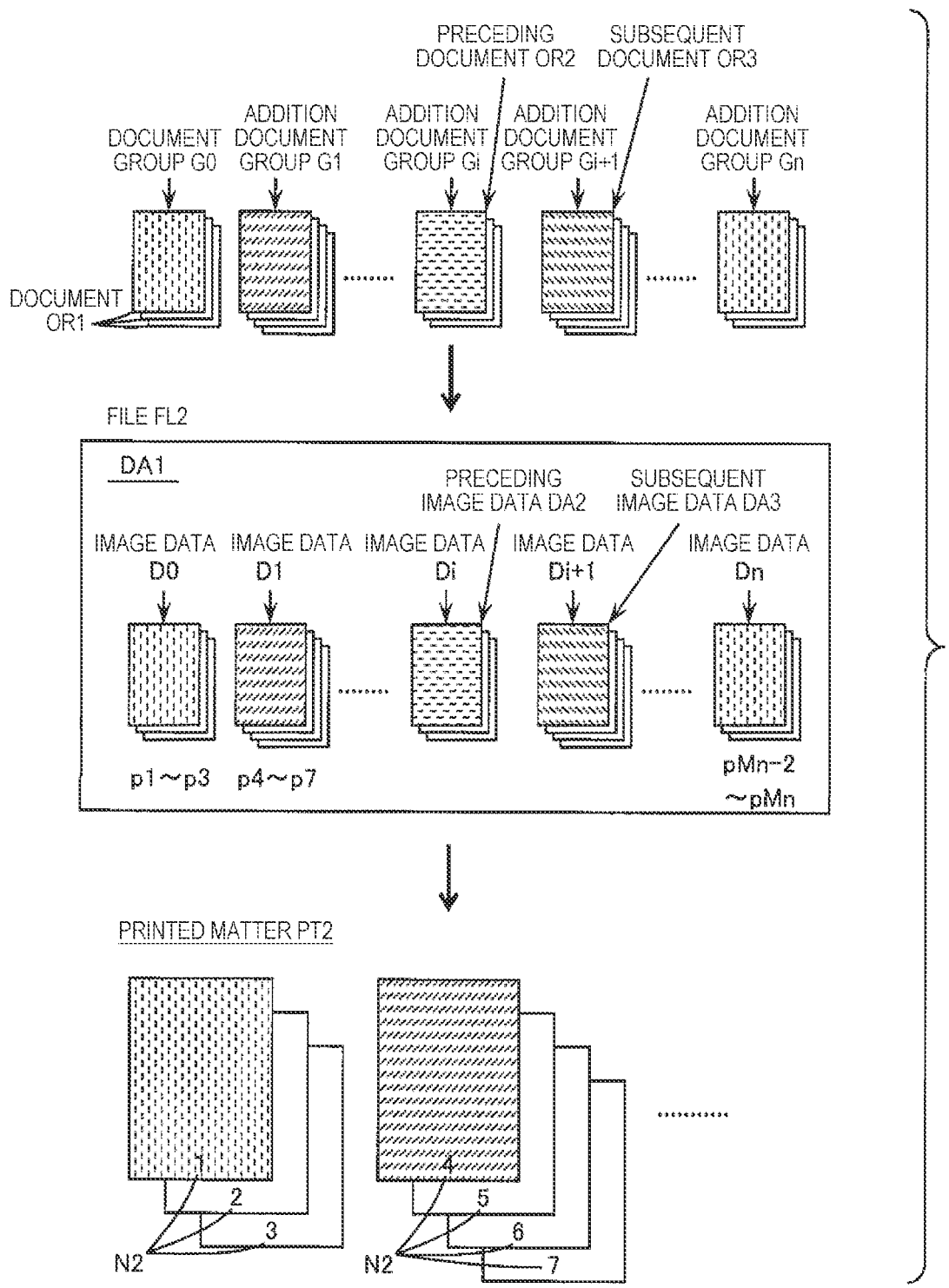
FIG. 9 is a diagram schematically showing an example in which the preceding image data and the subsequent image data are output as one file of consecutive pages.

As shown in FIGS. 4 and 5, the prompting unit 61 may receive a selection as to whether to separate and output the preceding image data DA2 and the subsequent image data DA3 or to output without separation during prompting of the addition. When a selection to output the preceding image data DA2 and the subsequent image data DA3 without separation is received, the output unit 62 may output the preceding image data DA2 and the subsequent image data DA3 read from the subsequent document OR3 according to the addition as one file FL2 of consecutive pages as shown in FIG. 9.

In the above case, the preceding image data DA2 and the subsequent image data DA3 can be output as one file FL2 of consecutive pages according to the selection. Therefore, convenience of the scanning system in the above aspect can be improved.

Aspect 8

As shown in FIGS. 7 and 8, the output unit 62 may output the preceding image data DA2 and the subsequent image data DA3 by printing the data on a printing unit (for example, a print engine 54). In the aspect, it is possible to obtain a printed matter of an image data group with a separator corresponding to document addition.

Aspect 9

An information processing program PRO according to an aspect of the present technique causes a computer (for example, a copier 1) to implement an acquisition function FU3 of acquiring the preceding image data DA2 obtained by reading the preceding document OR2 by the document reading unit 30 and the subsequent image data DA3 obtained by reading the subsequent document OR3 added after the preceding document OR2, and an output function FU2 of separating and outputting the preceding image data DA2 and the subsequent image data DA3.

The above aspect can provide an information processing program in which convenience of reading a document group is improved.

Further, the present technique can be applied to an information processing device included in the above-described scanning system, a complex system including the above-described scanning system, a scanning method, an information processing method included in the above-described scanning method, a computer-readable medium recording the above-described information processing program, and the like. The above-described information processing device may include a plurality of distributed parts.

2. Specific Example of Scanning System

FIG. 1 schematically shows a configuration of the scanning system SY1. The scanning system SY1 in the specific example is the single copier 1 (an example of an image forming device), and the scanning system SY1 may be a combination of an image forming device and an external device 100. The copier 1 may include additional elements not shown in FIG. 1. FIG. 2 schematically shows a state in which the preceding image data DA2 read from the preceding document OR2 and the subsequent image data DA3 read from the subsequent document OR3 are output as different files Fi and Fi+1. FIG. 3 schematically shows a state in which page numbers of different chapters Ci and Ci+1 are assigned to the preceding image data DA2 and the subsequent image data DA3.

The copier 1 shown in FIG. 1 includes a control unit 10, an operation panel 20, the document reading unit 30, a memory 40, and a file output unit 50.

The control unit 10 includes a CPU 11 as a processor, a ROM 12 as a semiconductor memory, a RAM 13 as a semiconductor memory, a storage unit 14, an I/F 15, and the like, and controls the operation panel 20, the document reading unit 30, the file output unit 50, and the like. Here, the CPU is an abbreviation for central processing unit, the ROM is an abbreviation for read only memory, the RAM is an abbreviation for random access memory, and the I/F is an abbreviation for interface. At least one of the storage unit 14 and the ROM 12 stores the information processing program PRO that causes a computer to function as the copier 1. The CPU 11 executes the information processing program PRO while using the RAM 13 as a work area to perform various kinds of processing such as control processing of the operation panel 20, control processing of the document reading unit 30, and control processing of the file output unit 50. The storage unit 14 may be a semiconductor memory called a flash memory, a magnetic recording medium called a hard disk, or the like. When the external device 100 is coupled, the I/F 15 transmits and receives data to and from the external device 100 according to a predetermined communication protocol. The external device 100 may be a personal computer including a tablet terminal, a mobile phone such as a smartphone, or a storage device such as a memory card.

The processor implementing the control unit 10 is not limited to one CPU, and may be a plurality of CPUs, a hardware circuit such as an ASIC, a combination of the CPU and the hardware circuit, or the like. The ASIC is an abbreviation of application specific integrated circuit.

The operation panel 20 includes the display unit 21 that displays a screen, an input unit 22 that receives an operation on a display screen, and the like. The operation panel 20 may include a dedicated CPU. The display unit 21 is an example of a notification unit. A display panel such as a liquid crystal panel or the like can be used as the display unit 21. As the input unit 22, a touch panel attached to a surface of the screen of the display unit 21, a hard key such as a keyboard, a pointing device, or the like can be used.

The document reading unit 30 includes a document conveying unit 31 that conveys the document OR1, a reading unit 32 of the document OR1, an image processing unit 33 that performs set image processing on the image data DA1, and the like. The document reading unit 30 may include a dedicated CPU. The document reading unit 30 reads the document OR1 and generates the image data DA1 of the plurality of pages read from the document OR1. Here, the document OR1 includes the preceding document OR2 and the subsequent document OR3, and the image data DA1 includes the preceding image data DA2 and the subsequent image data DA3. The document conveying unit 31 includes, for example, a feeding tray, a document detection sensor 31s, a feeding roller pair, a document separating unit, a multi feed detection unit, a conveying roller pair, a discharging roller pair, and a discharging tray. The document detection sensor 31s is disposed on the feeding tray and detects whether the document OR1 is set on the feeding tray. The document conveying unit 31 that continuously feeds a plurality of documents OR1 to the reading unit 32 is called an ADF or an automatic feeding device. Here, the ADF is an abbreviation for auto document feeder. When the document detection sensor 31s detects the document OR1, the document conveying unit 31 conveys the document OR1 one by one from the feeding tray to the reading unit 32. When the document detection sensor 31s does not detect the document OR1, the reading unit 32 reads the last document OR1 and then stops a conveyance operation of the document OR1. The reading unit 32 sequentially reads a plurality of documents OR1, generates the image data DA1 of the plurality of pages corresponding to the plurality of documents OR1, and stores the image data DA1 in the memory 40. The reading unit 32 may be, for example, an image sensor of a contact image sensor type which is abbreviated as a CIS type or a charge coupled devices type which is abbreviated as a CCD type, a CMOS image sensor, a solid-state image sensor such as a line sensor or an area sensor including a CCD, and a digital camera. Here, the CMOS is an abbreviation for complementary metal-oxide-semiconductor. The image processing unit 33 performs image processing of adjusting a color and the like according to an image setting such as a color on the image data DA1 of the plurality of pages stored in the memory 40. As the memory 40, a RAM, a nonvolatile semiconductor memory such as a flash memory can be used.

The file output unit 50 includes a file generation unit 53, the print engine 54, and the like. The file output unit 50 may include a dedicated CPU. The file generation unit 53 generates, based on the image data DA1 of the plurality of pages stored in the memory 40, files F0 to Fn shown in FIG. 2, the file FL1 shown in FIG. 3, and the file FL2 shown in FIG. 9. The files F0 to Fn, FL1, and FL2 may be a PDF file or a file in a format such as a bitmap file. The print engine 54 is an example of a printing unit, and executes printing on a print medium based on the image data DAL stored in the memory 40 and a print job received from the external device 100. For example, when the operation panel 20 receives a copy of the document OR1, the document reading unit 30 reads the document OR1 to generate the image data DA1, and the print engine 54 prints a document image on the print medium based on the image data DA1. Accordingly, a copying function is implemented. In addition, when the I/F 15 receives the print job from the external device 100, the control unit 10 generates image data for printing based on the print job and transfers the image data to the print engine 54, and the print engine 54 prints the image on the print medium based on the image data for printing. Accordingly, a printing function is implemented.

The information processing program PRO causes the copier 1 to implement a prompting function FU1, the output function FU2, the acquisition function FU3, and the like. As shown in FIG. 4, the prompting function FU1 prompts the addition of the subsequent document OR3 subsequent to the preceding document OR2 after the document reading unit 30 reads the preceding document OR2. Details of the prompting function FU1 will be described later. A prompting program for causing the copier 1 to implement the prompting function FU1 may be executed by the CPU 11 of the control unit 10, may be executed by the CPU of the operation panel 20, or may be executed by both the CPU 11 of the control unit 10 and the CPU of the operation panel 20. The control unit 10 and the operation panel 20 that execute the prompting program function as the prompting unit 61. The acquisition function FU3 is to acquire the preceding image data DA2 obtained by reading the preceding document OR2 by the document reading unit 30 and the subsequent image data DA3 obtained by reading the subsequent document OR3 added after the preceding document OR2. Details of the acquisition function FU3 will be described later. The output function FU2 is to cause the document reading unit 30 to read the subsequent document OR3 according to the addition of the subsequent document OR3, and to separate and output the preceding image data DA2 read from the preceding document OR2 and the subsequent image data DA3 read from the subsequent document OR3. Details of the output function FU2 will be described later. An output program for causing the copier 1 to implement the output function FU2 may be executed by the CPU 11 of the control unit 10, may be executed by the CPU of the file output unit 50, or may be executed by both the CPU 11 of the control unit 10 and the CPU of the file output unit 50. The control unit 10 and the file output unit 50 that execute the output program function as the output unit 62.

The storage unit 14 storing the information processing program PRO can be said to be a computer-readable medium recording the information processing program PRO. When the information processing program PRO is recorded in an external recording medium, the storing medium can be said to be a computer-readable medium recording the information processing program PRO.

The copier 1 has a document addition function, and is capable of reading a large number of documents OR1 by dividing the documents into a plurality of parts. First, with reference to FIG. 9, an example in which the image data DA1 of the plurality of pages corresponding to all the documents OR1 are collected into one file FL2 of consecutive pages will be described.

FIG. 9 schematically shows a state in which the preceding image data DA2 and the subsequent image data DA3 are output as one file FL2 of consecutive pages. FIG. 9 shows a state in which Mn documents OR1 are read by adding the documents n times. The Mn documents OR1 are divided n+1 times and read.

An upper part of FIG. 9 shows document groups G0, G1 to Gi, and Gi+1 to Gn divided n+1 times. A variable i for identifying the document group is an integer of 0 or more and n or less. The document group Gi means one or more documents OR1 set at an i-th position on the feeding tray of the document conveying unit 31 as the ADF. The document group G0 is one or more documents OR1 to be first set on the feeding tray, and the added document groups G1 to Gi, and Gi+1 to Gn are sequentially added due to the document addition function. When the variable i is smaller than the number of additions n and the document group Gi is applied to the preceding document OR2, the document group Gi+1 is the subsequent document OR3 subsequent to the preceding document OR2. Of course, the preceding document OR2 can be applied to any of the document groups G0 to Gn−1, and the subsequent document OR3 is relatively determined from the document groups G1 to Gn.

A middle part of FIG. 9 shows one file FL2 including image data D0, D1 to Di, Di+1 to Dn read from the document groups G0, G1 to Gi, Gi+1 to Gn. The image data D0 to Dn form the image data DAL of a total of Mn pages. When the variable i is smaller than the number of additions n and the document group Gi is applied to the preceding document OR2, the image data Di is applied to the preceding image data DA2, and the image data Di+1 is applied to the subsequent image data DA3. Of course, the preceding image data DA2 can be applied to any of the image data D0 to Dn−1, and the subsequent image data DA3 is relatively determined from the image data D1 to Dn.

Actually, the image data D0 to Dn are not separated in the file FL2, and consecutive pages are assigned to the image data D0 to Dn throughout. For example, when the document group G0 includes three documents OR1, pages 1 to 3 are assigned to the image data D0, when the document group G1 includes four documents OR1, pages 4 to 7 are assigned to the image data D0, and when the document group Gn includes three documents OR1, pages Mn−2 to Mn are assigned to the image data Dn. The user who displays contents of the file FL2 can see images of consecutive pages 1 to Mn, but cannot understand that there is a separator between the image data Di and the image data Di+1.

A lower part of FIG. 9 shows a printed matter PT2 of the file FL2. During printing of the file FL2, the copier 1 can combine a page number N2 assigned to each page at a set location, such as a bottom center position and an upper right position. Of course, in the example shown in FIG. 9, there is no separator between a third page and a fourth page.

As described above, file output processing shown in FIG. 9 can be said to output the preceding image data DA2 and the subsequent image data DA3 in the same manner. Further, it can be said that the preceding image data DA2 and the subsequent image data DA3 are subjected to the same processing and output.

Certain users do not wish to collect the image data D0 to Dn read from a plurality of divided document groups G0 to Gn into one file FL2 of consecutive pages. For example, when a page number of the document OR1 is large, it is difficult to search for a desired location from the image data DA1 of the plurality of pages included in the obtained file FL2. In such a case, the user may wish to separate the large number of documents OR1 in the middle.

Here, in order to separate the large number of documents OR1 in the middle, it is conceivable to insert a piece of insertion paper referred to as colored paper into a location to be separated among the large number of documents OR1. However, in this case, it is necessary for the user to prepare for the number of pieces of insertion paper to be used as separators apart from the document OR1.

In the specific example, in order to cope with the above-described inconvenience, timings for document addition is set at separators P1 (see FIGS. 2 and 3) of the image data D0, D1 to Di, Di+1 to Dn. Accordingly, the user can easily cause the scanning system SY1 to read a desired document.

In the example shown in FIG. 2, the preceding image data DA2 and the subsequent image data DA3 are output as different files Fi and Fi+1. The image data D0, D1 to Di, Di+1 to Dn are divided into the files F0, F1 to Fi, Fi+1 to Fn, so that the separators P1 are generated.

As described above, an uppermost part of FIG. 2 shows the document groups G0, G1 to Gi, Gi+1 to Gn divided n+1 times. The image data D0, D1 to Di, Di+1 to Dn read from the document groups G0, G1 to Gi, Gi+1 to Gn are shown below. However, unlike the example shown in FIG. 9, the image data D0 to Dn are not stored in one file. In order to generate the separate files F0 to Fn, the output unit 62 generates a separation table TA1. The separation table TA1 stores the total number of documents OR1 read from the first document OR1 of the document group G0 at respective number of additions n, and stores a total number Mn of the documents OR1 at each number of additions n. For example, when the document group G0 includes three documents OR1 and the document group G1 includes four documents OR1, the number of additions n=1 is associated with 3+4=7 and stored in the separation table TA1.

A lowermost part of FIG. 2 shows a state in which the files F0, F1 to Fi, Fi+1 to Fn including the image data D0, D1 to Di, Di+1 to Dn are stored in one folder FD1. When the variable i is smaller than the number of additions n and the document group Gi is applied to the preceding document OR2, the file Fi including the image data Di is applied to a preceding file including the preceding image data DA2, and the file Fi+1 including the image data Di+1 is applied to a subsequent file including the subsequent image data DA3. Of course, the preceding file can be applied to any of the files F0 to Fn−1, and the subsequent file is relatively determined from the files F1 to Fn.

As described above, the file output processing shown in FIG. 2 can be said to output the preceding image data DA2 and the subsequent image data DA3 differently. Further, it can be said that the preceding image data DA2 and the subsequent image data DA3 are subjected to different processing and output.

Since the image data D0 to Dn are divided into the files F0 to Fn in the folder FD1, the separators P1 are generated. Therefore, even when the user does not insert the insertion paper into the large number of documents OR1, the user can divide the large number of documents OR1 into the plurality of files F0 to Fn and cause the copier 1 to read the files.

In the example shown in FIG. 3, one file FL1 to which page numbers of different chapters Ci and Ci+1 are assigned to the preceding image data DA2 and the subsequent image data DA3 is output.

In FIG. 3, one file FL1 including the image data D0, D1 to Di, Di+1 to Dn in different chapters C0, C1 to Ci, Ci+1 to Cn is shown under the separation table TA1. When the variable i is smaller than the number of additions n and the document group Gi is applied to the preceding document OR2, the chapter Ci including the image data Di is applied to a preceding chapter including the preceding image data DA2, and the chapter Ci+1 including the image data Di+1 is applied to a subsequent chapter including the subsequent image data DA3. Of course, the preceding chapter can be applied to any of the chapters C0 to Cn−1, and the subsequent chapter is relatively determined from the chapters C1 to Cn.

A lowermost part of FIG. 3 shows a printed matter PT1 of the file FL1. During printing of the file FL1, the copier 1 can combine the chapter-attached page number N1 assigned to each page at a set location, such as a bottom center position and an upper right position. The chapter-attached page number N1 shown in FIG. 3 indicates the chapter Ci before the hyphen and indicates a page number starting from page one after the hyphen in each chapter Ci. An expression of the chapter-attached page number N1 is not limited to "chapter-page number" such as "1-2", and may be "chapter (page number)" such as "1(2)", a "page number (chapter)" such as "2(1)", and the like. In addition, the page number of each chapter Ci is not limited to the page number starting from page one, and may be a page number continuous over the entire image data D0 to Dn, such as "1-4" subsequent to "0-3", so that the page number of the subsequent chapter is subsequent to the page number of the preceding chapter.

As described above, the file output processing shown in FIG. 3 can be said to output the preceding image data DA2 and the subsequent image data DA3 differently. Further, it can be said that the preceding image data DA2 and the subsequent image data DA3 are subjected to different processing and output.

Since the image data D0 to Dn are divided into the chapters C0 to Cn in the file FL1, the separators P1 are generated. Therefore, even when the user does not insert the insertion paper into the large number of documents OR1, the user can divide the large number of documents OR1 into the plurality of chapters C0 to Cn and cause the copier 1 to read the chapters.

FIG. 4 shows a document addition UI screen 500 displayed on the display unit 21 by the prompting unit 61 in order to implement the processing shown in FIGS. 2 and 3. Here, the UI is an abbreviation for user interface.

The document addition UI screen 500 includes check boxes 501 and 502, a "start reading" button 503, a "no next document" button 504, a "cancel" button 505, and the like.

The check boxes 501 and 502 are operation areas for selecting which processing shown in FIGS. 2, 3, and 9 will be performed when the document addition function is turned on in a reading setting screen 520 to be described later (see FIG. 5). Only one of the check boxes 501 and 502 can be checked. The check box 501 for generating a file group is an operation area for generating the files F0 to Fn shown in FIG. 2, and when the check box 501 is checked, the files F0 to Fn are generated from the document groups G0 to Gn. The check box 502 for generating a chapter-attached file is an operation area for generating one file FL1 shown in FIG. 3, and when the check box 502 is checked, the file FL1 to which the chapter-attached page number N1 is assigned from the document groups G0 to Gn is generated. When the check boxes 501 and 502 are not checked, one file FL2 of consecutive pages is generated as shown in FIG. 9. When the input unit 22 receives an operation of the "start reading" button 503, the document group Gi added to the feeding tray is read. When the input unit 22 receives an operation of the "no next document" button 504, the files F0 to Fn shown in FIG. 2, the file FL1 shown in FIG. 3, and the file FL2 shown in FIG. 9 are generated. When the input unit 22 receives the operation of the "cancel" button 505, reading of the document OR1 is cancelled, and the files F0 to Fn, FL1, and FL2 are not generated.

As described above, the prompting unit 61 that displays the document addition UI screen 500 prompts the addition of the subsequent document OR3 after the document reading unit 30 reads the preceding document OR2.

FIG. 5 shows the reading setting screen 520 displayed on the display unit 21 by the prompting unit 61 in order to set details of the document addition function.

The reading setting screen 520 includes a storage folder name input field 521, a file name input field 522, a check box 523, radio buttons 524 to 526, an "OK" button 527, and the like.

The storage folder name input field 521 is an operation area for inputting a name of a folder for storing a generated file. When the input unit 22 receives the input of the name to the storage folder name input field 521, the file is stored in the folder of the name indicated in the storage folder name input field 521. The file name input field 522 is an operation area for inputting a name of a generated file. When the input unit 22 receives the input of the name to the file name input field 522, the file including the name indicated in the file name input field 522 is stored in the above-described folder. When the files F0 to Fn shown in FIG. 2 are generated, consecutive numbers may be assigned to the file names as shown in FIG. 7. The check box 523 is an operation area for selecting whether to enable the document addition function. When the check box 523 is checked, the document addition function is enabled, and when the check box 523 is not checked, the document addition function is disabled.

When the check box 523 is checked, any one of the radio buttons 524 to 526 is selected. When the radio button 524 for generating a file of consecutive pages is selected, the check boxes 501 and 502 shown in FIG. 4 are not checked, and one file FL2 of consecutive pages is generated as shown in FIG. 9. When the radio button 525 for generating a file group is selected, the check box 501 shown in FIG. 4 is checked, and the files F0 to Fn shown in FIG. 2 are generated. When the radio button 526 for generating a chapter-attached file is selected, the check box 502 shown in FIG. 4 is checked, and the file FL1 shown in FIG. 3 is generated. When the input unit 22 receives the operation of the "OK" button 527, processing corresponding to the input to the reading setting screen 520 is performed.

As described above, the prompting unit 61 that displays the reading setting screen 520 receives a selection as to whether to separate and output the preceding image data DA2 and the subsequent image data DA3 or output without separation during prompting of document addition.

3. Specific Example of File Generation Processing

Figure 6:
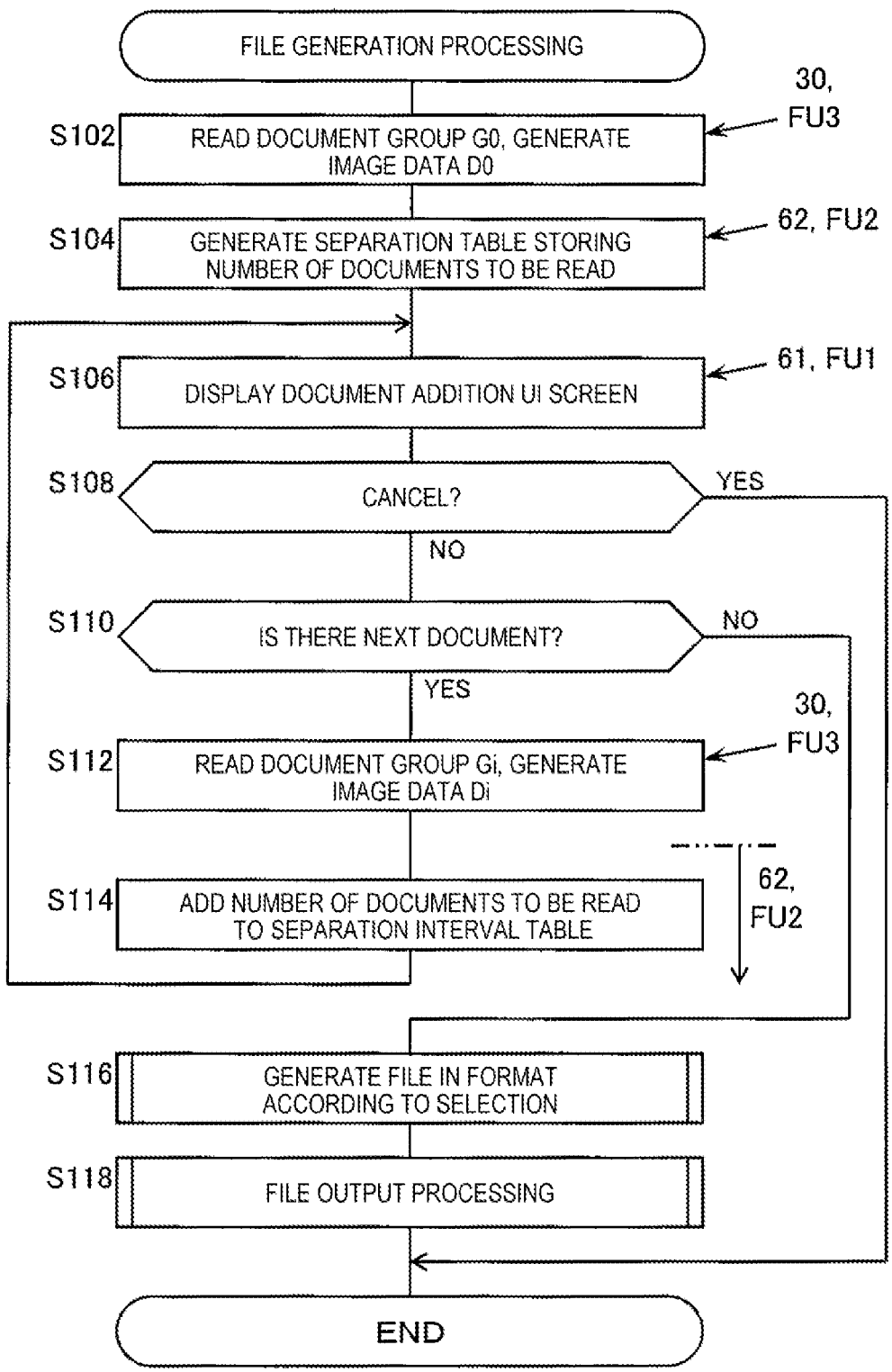
FIG. 6 is a flowchart schematically showing an example of file generation processing.

Hereinafter, an example of file generation processing of separating and outputting the preceding image data DA2 and the subsequent image data DA3 will be described with reference to FIG. 6 and the like. The file generation processing shown in FIG. 6 is mainly performed by the control unit 10. Upon receiving an instruction to generate a file in the operation panel 20 or the external device 100, the control unit 10 starts the file generation processing. Here, the control unit 10 performs processing of steps S102 to S112 in cooperation with the document reading unit 30. Therefore, steps S102 and S112 correspond to the acquisition function FU3. Hereinafter, a description of "step" will be omitted.

The control unit 10 performs processing of S106 in cooperation with the operation panel 20. Therefore, S106 corresponds to the prompting unit 61 and the prompting function FU1. The control unit 10 performs processing of S104 and S114 to S118 in cooperation with the file generation unit 53. Therefore, S104 and S114 to S118 correspond to the output unit 62 and the output function FU2.

As a premise that the file generation processing shown in FIG. 6 is performed, it is assumed that the control unit 10 causes the display unit 21 to display the reading setting screen 520 shown in FIG. 5, and that the input unit 22 receives the input to the input fields (521, 522). It is assumed that the check box 523 is checked and one of the radio buttons 525 and 526 is selected.

It is assumed that the user sets the document group G0 on the feeding tray of the document conveying unit 31 serving as an ADF before instructing file generation. When the document group G0 is set on the feeding tray, the document detection sensor 31s detects a set of the document OR1, and thus the document conveying unit 31 sequentially sends the document OR1 to the reading unit 32 according to instructions from the control unit 10.

When the file generation processing is started, the document reading unit 30 reads the first document group G0 and generates the image data D0 in the memory 40 (S102). When all the document group G0 is fed from the feeding tray, the document detection sensor 31s detects that the document OR1 is not set, and thus the document conveying unit 31 stops a conveyance operation of the document OR1 after the reading unit 32 reads the last document OR1.

Next, the file generation unit 53 generates the separation table TA1 (see FIG. 2) in which the number of documents to be read in the document group G0 is stored (S104). For example, when the number of documents to be read in the document group G0 is three, the file generation unit 53 generates the separation table TA1 in which the number of additions of 0 times and the number of documents to be read of 3 are stored in association with each other.

Next, the operation panel 20 displays the document addition UI screen 500 (see FIG. 4) on the display unit 21 (S106). When the radio button 525 for generating a file group is selected on the reading setting screen 520 shown in FIG. 5, the operation panel 20 enters a state in which the check box 501 shown in FIG. 4 is checked. When the radio button 526 for generating a chapter-attached file is selected on the reading setting screen 520 shown in FIG. 5, the operation panel 20 enters a state in which the check box 502 shown in FIG. 4 is checked. The input unit 22 may receive an operation of changing a check state of the check boxes 501 and 502.

As described above, the prompting unit 61 prompts the addition of the subsequent document OR3 after the document reading unit 30 reads the preceding document OR2. When adding an i-th document group Gi, the user operates the "start reading" button 503 after setting the i-th document group Gi on the document conveying unit 31 serving as the ADF. When the document group Gi is set on the feeding tray, the document detection sensor 31s detects a set of the document OR1, and thus the document conveying unit 31 sequentially sends the document OR1 to the reading unit 32 according to instructions from the control unit 10.

When the input unit 22 receives an operation on the document addition UI screen 500 by the user, the control unit 10 branches the processing depending on the buttons (503 to 505) for which the operation is received (S108, S110). When the input unit 22 receives the operation of the "cancel" button 505, the control unit 10 ends the file generation processing without outputting the file (YES in S108). When the input unit 22 receives the operation of the "start reading" button 503, the control unit 10 advances the processing to S112 (YES in S110). When the input unit 22 receives the operation of the "no next document" button 504, the control unit 10 advances the processing to S116 (NO in S110).

In S112, the document reading unit 30 reads the i-th document group Gi of the addition to generate the image data Di in the memory 40. When all the document group Gi is fed from the feeding tray, the document detection sensor 31s detects that the document OR1 is not set, and thus the document conveying unit 31 stops a conveyance operation of the document OR1 after the reading unit 32 reads the last document OR1.

Next, the file generation unit 53 adds a total number of documents to be read Mi up to the document group Gi to the separation table TA1 (see FIG. 2) (S114). Thereafter, the control unit 10 returns the processing to S106. The processing of S106 to S114 is repeated for n times of the number of document additions as long as the "start reading" button 503 is operated on the document addition UI screen 500.

When the "no next document" button 504 is operated on the document addition UI screen 500, a file in a format corresponding to a selection operation to the check boxes 501 and 502 is generated by the file generation unit 53 (S116). For example, when the check box 501 for generating the file group is checked, the file generation unit 53 performs the processing of S202 to S214 shown in FIG. 7 to generate the files F0 to Fn in the folder FD1 (see FIG. 2). When the check box 502 for generating the chapter-attached file is checked, the file generation unit 53 performs the processing of S302 to S314 shown in FIG. 8 to generate the file FL1 including the chapters C0 to Cn (see FIG. 3). When the check boxes 501 and 502 are not checked, the file generation unit 53 generates the file FL2 in which all the image data D0 to Dn are made into consecutive pages, as shown in FIG. 9. In other words, when the selection to output the preceding image data DA2 and the subsequent image data DA3 without separation is received, the output unit 62 outputs the preceding image data DA2 and the subsequent image data DA3 as one file FL2 of consecutive pages.

Although the file generation processing shown in FIG. 6 may end when the processing of S116 is completed, the file generation unit 53 may perform the file output processing after the processing of S116 (S118). The file output processing may be processing of printing a file as shown in FIGS. 7 and 8. In addition, the file output processing may be processing of outputting a file to the external device 100, processing of transmitting a file with an e-mail, processing of storing the file in the storage unit 14 of the copier 1, or processing of displaying the file on the display unit 21 of the copier 1.

FIG. 7 schematically shows file group generation and output processing performed by the file generation unit 53. S202 to S214 shown in FIG. 7 correspond to S116 of FIG. 6, and S216 to S218 shown in FIG. 7 correspond to S118 of FIG. 6.

When the file group generation and output processing is started, the file generation unit 53 creates empty files with n+1 consecutive file names in the folder FD1 with a name input in the storage folder name input field 521 shown in FIG. 5 (S202). In FIG. 7, the empty files with n+1 consecutive file names created in the folder FD1 are shown in a box of S202. The n+1 empty files become final files F0 to Fn (see FIG. 2) by storing the image data Di. The name of each file name excluding the consecutive part is the name input to the file name input field 522 shown in FIG. 5. The consecutive part shown in FIG. 7 is a four-digit number 0000, 0001 to 000n starting from 0. The consecutive part may be a number of three digits or less, a number of five digits or more, or a number starting from one or more.

As described above, the output unit 62 adds a name including consecutive numbers to each of the files F0, F1 to Fi, Fi+1 to Fn.

Next, the file generation unit 53 substitutes 0 for the variable i (S204). The processing of S204 is processing of initializing the variable i.

After the variable i is initialized, the file generation unit 53 stores the image data Di for one page in the file Fi of an i-th group (S206), and assigns a page number to the page (S208). For example, the file generation unit 53 assigns a page number starting from page one to each page of the image data Di stored in the file Fi and stores information indicating the page number in the file Fi. When the variable i is 1 or more, the file generation unit 53 may assign a page number subsequent to the page number of the last page of the file Fi−1 preceding each page of the image data Di stored in the file Fi.

After the page number is assigned, the file generation unit 53 repeats the processing of S206 to S208 until the total number of pages of the image data stored in the files F0 to Fi reaches the total number of documents to be read Mi of the separation table TA1 (S210). When the total number of pages reaches the total number of documents to be read Mi, the file generation unit 53 adds 1 to the variable i (S212), and repeats the processing of S206 to S212 when the variable i is equal to or smaller than the number of document additions n (S214). When the variable i is more than the number of document additions n, the files F0, F1 to Fi, Fi+1 to Fn including the image data D0, D1 to Di, Di+1 to Dn are stored in one folder FD1.

As described above, the file generation unit 53 collectively outputs the image data D0, D1 to Di, Di+1 to Dn as different files F0, F1 to Fi, Fi+1 to Fn. In other words, the output unit 62 separates the preceding image data DA2 and the subsequent image data DA3 into different files Fi and Fi+1 and outputs the files.

During printing the files F0 to Fn, the file generation unit 53 combines the page numbers at the set locations of the respective pages of the image data D0 to Dn included in the files F0 to Fn, such as the bottom center position and the upper right position (S216). The page number to be combined is the page number assigned to the page included in the file Fi in S208. Finally, the file generation unit 53 causes the print engine 54 to print the image data D0 to Dn to which the page number is combined (S218), and ends the file group generation and output processing.

As shown in the lowermost part of FIG. 2, since the image data D0 to Dn are divided into the files F0 to Fn in the folder FD1, the separators P1 are generated. Therefore, the user can divide the large number of documents OR1 into the plurality of files F0 to Fn and cause the copier 1 to read the files without using the insertion paper, and the files F0 to Fn can be output to the copier 1.

FIG. 8 schematically shows chapter-attached file generation and output processing performed by the file generation unit 53. S302 to S314 shown in FIG. 8 correspond to S116 of FIG. 6, and S316 to S318 shown in FIG. 8 correspond to S118 of FIG. 6.

When the chapter-attached file generation and output processing is started, the file generation unit 53 creates an empty file in the folder FD1 with a name input in the storage folder name input field 521 shown in FIG. 5 (S302). The empty file finally becomes one file FL1 by storing the image data D0 to Dn to which the page numbers of the chapters C0 to Cn shown in FIG. 3 are assigned. The name of the empty file is the name input to the file name input field 522 shown in FIG. 5.

Next, the file generation unit 53 substitutes 0 for the variable i (S304). The processing of S304 is processing of initializing the variable i.

After the variable i is initialized, the file generation unit 53 stores the image data Di for one page (S306), and assigns the chapter-attached page number N1 to the page (S308). For example, the file generation unit 53 assigns the chapter-attached page number N1 whose page number starts from page one excluding the chapter Ci to each page of the image data Di assigned to the chapter Ci, and stores information indicating the chapter-attached page number N1 in the file FL1. When the variable i is 1 or more, the file generation unit 53 may assign a page number excluding the chapter Ci subsequent to the page number excluding chapter Ci of the last page of the chapter Ci−1 preceding each page of the image data Di assigned to the chapter Ci.

After the page number is assigned, the file generation unit 53 repeats the processing of S306 to S308 until the total number of pages of the image data stored in the file FL1 reaches the total number of documents to be read Mi of the separation table TA1 (S310). When the total number of pages reaches the total number of documents to be read Mi, the file generation unit 53 adds 1 to the variable i (S312), and repeats the processing of S306 to S312 when the variable i is equal to or smaller than the number of document additions n (S314). When the variable i is more than the number of document additions n, one file FL1 to which chapter C0, C1 to Ci, Ci+1 to Cn are assigned to the image data D0, D1 to Di, Di+1 to Dn is stored in the folder FD1.

As described above, the file generation unit 53 assigns the page numbers of different chapters C0, C1 to Ci, Ci+1 to Cn to the image data D0, D1 to Di, Di+1 to Dn, and collectively outputs the pages as one file FL1. In other words, the output unit 62 assigns the page numbers of different chapters Ci and Ci+1 to the preceding image data DA2 and the subsequent image data DA3, separates the preceding image data DA2 and the subsequent image data DA3, and outputs together as one file FL1.

During printing the file FL1, the file generation unit 53 combines the chapter-attached page numbers N1 at the set locations of the respective pages of the image data D0 to Dn included in the file FL1, such as the bottom center position and the upper right position, as shown in the lowermost part of FIG. 3 (S316). The chapter-attached page number N1 to be combined is the chapter-attached page number N1 assigned to the page included in the file FL1 in S308. Finally, the file generation unit 53 causes the print engine 54 to print the image data D0 to Dn to which the chapter-attached page number N1 is combined (S318), and ends the file group generation and output processing.

As described above, the file generation unit 53 combines the chapter-attached page number N1, which is the page number to which the chapters C0 to Cn are attached, to the image data D0 to Dn, and causes the print engine 54 to perform printing. In other words, the output unit 62 combines, to the preceding image data DA2 and the subsequent image data DA3, the chapter-attached page number N1, which is a page number to which the chapters Ci and Ci+1 are attached, and outputs the composite.

As shown in FIG. 3, since the image data D0 to Dn are divided into the chapters C0 to Cn in one file FL1, the separators P1 are generated. Therefore, the user can divide the large number of documents OR1 into the plurality of chapters C0 to Cn and cause the copier 1 to read the chapters without using the insertion paper, and the image data D0 to Dn divided into the chapters C0 to Cn can be output to the copier 1.

As described above, the output image data D0, D1 to Di, Di+1 to Dn are separated into different files F0, F1 to Fi, Fi+1 to Fn, or different chapters C0, C1 to Ci, Ci+1 to Cn. In other words, the preceding image data DA2 read from the preceding document OR2 and the subsequent image data DA3 read from the subsequent document OR3 are separated into different files Fi, Fi+1, or different chapters Ci, Ci+1. Since the output image data D0 to Dn have the separator P1 corresponding to document addition, the present scanning system SY1 is convenient. The user can easily cause the scanning system SY1 to read a desired document.

The scanning system SY1 may generate the files F0 to Fn shown in FIG. 2 without generating one file FL1 shown in FIG. 3. In this case, the file generation unit 53 may perform the file group generation and output processing shown in FIG. 7 without performing the chapter-attached file generation and output processing shown in FIG. 8.

On the other hand, the scanning system SY1 may generate one file FL1 shown in FIG. 3 without generating the files F0 to Fn shown in FIG. 2. In this case, the file generation unit 53 may perform the chapter-attached file generation and output processing shown in FIG. 8 without performing the file group generation and output processing shown in FIG. 7.

4. Modifications

Various modifications of the present disclosure are considered.

For example, the copier 1 may be a multifunction peripheral having a facsimile communication function or the like. In addition, in the scanning system SY1, a dedicated scanner, a digital camera, or the like may be used as a document reading of unit instead the copier 1. Alternatively, a smartphone, a tablet computer, or a personal computer may be used as the scanning system SY1.

A part of the above-described processing may be performed by the external device 100. In this case, a combination of the copier 1 and the external device 100 is an example of the scanning system SY1.

The above-described processing can be appropriately changed, such as changing the order. For example, the processing of S108 and the processing of S110 can be interchanged in the file generation processing shown in FIG. 6, and the processing of S202 and the processing of S204 can be interchanged in the file group generation and output processing shown in FIG. 7.

The output unit 62 may collectively output the files F0 to Fn shown in FIG. 2 into one compressed file. Also in this case, the preceding image data DA2 and the subsequent image data DA3 are output as different files Fi and Fi+1.

When the check states of the check boxes 501 and 502 included in the document addition UI screen 500 shown in FIG. 4 are changed during document addition, the file generation unit 53 may generate a file reflecting the change of the check state.

For example, it is assumed that the check box 501 for generating a file group is checked when starting reading a document, and that the check box 502 for generating a chapter-attached file is checked in the middle. In this case, the file generation unit 53 may assign different chapters C0, C1, and so on to the files F0, F1, and so on before the check state is changed, and may generate one file FL1 in which different chapters ( . . . , Cn−1, Cn) are assigned to the image data ( . . . , Dn−1, Dn) after the check state is changed. It is also assumed that the check box 502 for generating a chapter-attached file is checked when starting reading a document, and that the check box 501 for generating a file group is checked in the middle. In this case, the file generation unit 53 may generate one file FL1 in which different chapters C0, C1, and so on are assigned to the image data D0, D1, and so on before the check state is changed, and assign different chapters ( . . . , Cn−1, Cn) to the files ( . . . , Fn−1, Fn) generated after the check state is changed. When one of the check boxes 501 and 502 is detached in the middle and the processing of FIG. 9 is performed or when one of the check boxes 501 and 502 is checked while the processing of FIG. 9 is being performed, the file generation unit 53 can generate a file reflecting a change in the check state.

The file generation unit 53 may not have one of the functions of file group generation and chapter-attached file generation. Alternatively, the file generation unit 53 may generate a file by separating image data read from a document before and after addition by a function that is neither the file group generation nor the chapter-attached file generation.

5. Conclusion

As described above, according to the present disclosure, it is possible to provide a scanning system technique or the like that improves convenience of reading a document group according to various aspects. Of course, basic operations and effects described above can also be obtained by the technique including only constituent features according to the independent claims.

In addition, configuration in which the configurations disclosed in the above-described examples are mutually replaced or a combination thereof is changed, a configuration in which the configurations disclosed in the known technique and the above-described examples are mutually replaced or a combination thereof is changed, and the like can be implemented. The present disclosure also includes such configurations.

What is claimed is:

1. A scanning system comprising:
  an image sensor
    configured to read a preceding document to digitally generate preceding image data from the preceding document, and
    configured to read a subsequent document subsequent to the preceding document according to an addition operation of the subsequent document to digitally generate subsequent image data; and
  a processor
    configured to prompt a user to perform the addition operation of the subsequent document and a selection between a first setting in which the preceding image data and the subsequent image data are output in different digital files, respectively, and a second setting in which the preceding image data and the subsequent image data are output with different indicators, respectively, in one digital file, after the image sensor reads the preceding document, and
    configured to
      digitally generate, in response to receiving a selection of the second setting, the one digital file that contains the preceding image data and the subsequent image data with the different indicators, respectively, after the image sensor reads the subsequent document in response to the addition operation of the subsequent document, and
      digitally generate, in response to receiving a selection of the first setting, the different digital files that contain the preceding image data and the subsequent image data, respectively, after the image sensor reads the subsequent document in response to the addition operation of the subsequent document.

2. The scanning system according to claim 1, wherein the processor outputs the preceding image data and the subsequent image data as the different digital files.

3. The scanning system according to claim 2, wherein the processor adds a name including consecutive numbers to the different digital files.

4. The scanning system according to claim 1, wherein the processor assigns page numbers of different chapters to the preceding image data and the subsequent image data and outputs the preceding image data and the subsequent image data.

5. The scanning system according to claim 4, wherein the processor outputs the preceding image data and the subsequent image data as the one digital file.

6. The scanning system according to claim 4, wherein the processor combines, to the preceding image data and the subsequent image data, the page numbers to which the chapters are attached, and outputs the composite.

7. The scanning system according to claim 1, wherein in response to receiving the selection of the second setting, the processor outputs the preceding image data and the subsequent image data as consecutive pages of the one digital file.

8. The scanning system according to claim 1, wherein the processor executes a printer to print the preceding image data and the subsequent image data to output data.

9. A non-transitory computer-readable storage medium storing an information processing program, the program causing a computer to execute:
  acquiring preceding image data digitally generated by reading a preceding document by an image sensor and subsequent image data digitally generated by reading a subsequent document subsequent to the preceding document according to an addition operation of the subsequent document;
  prompting a user to perform the addition operation of the subsequent document and a selection between a first setting in which the preceding image data and the subsequent image data are output in different digital files, respectively, and a second setting in which the preceding image data and the subsequent image data are output with different indicators, respectively, in one digital file, after the image sensor reads the preceding document; and
  digitally generating, in response to receiving a selection of the second setting, the one digital file that contains the preceding image data and the subsequent image data with the different indicators, respectively, after the image sensor reads the subsequent document in response to the addition operation of the subsequent document, and
  digitally generating, in response to receiving a selection of the first setting, the different digital files that contain the preceding image data and the subsequent image data, respectively, after the image sensor reads the subsequent document in response to the addition operation of the subsequent document.

\* \* \* \* \*